(12) United States Patent
Redmond et al.

(10) Patent No.: US 12,481,728 B2
(45) Date of Patent: Nov. 25, 2025

(54) LOCATION-BASED LICENSING AND CONFIGURATION

(71) Applicant: Schneider Electric Systems USA, Inc., Foxboro, MA (US)

(72) Inventors: James Redmond, Richmond (CA); Stephen Neave, Kanata (CA)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 329 days.

(21) Appl. No.: 17/830,495

(22) Filed: Jun. 2, 2022

(65) Prior Publication Data

US 2023/0393562 A1    Dec. 7, 2023

(51) Int. Cl.
*G06F 21/10*       (2013.01)
*G05B 19/418*      (2006.01)
*G06Q 10/0631*     (2023.01)
*G06Q 50/04*       (2012.01)

(52) U.S. Cl.
CPC ......... *G06F 21/10* (2013.01); *G05B 19/4183* (2013.01); *G06Q 10/0631* (2013.01); *G06Q 50/04* (2013.01)

(58) Field of Classification Search
CPC .......................... G06F 21/10; G05B 19/4183; G06Q 10/0631; G06Q 50/04
See application file for complete search history.

(56) References Cited

U.S. PATENT DOCUMENTS

| | | | |
|---|---|---|---|
| 2002/0017977 A1* | 2/2002 | Wall ........................ | G06Q 10/08 340/8.1 |
| 2013/0104248 A1* | 4/2013 | Dudek ..................... | H04W 4/02 726/29 |
| 2018/0314808 A1 | 11/2018 | Casey et al. | |
| 2021/0352110 A1* | 11/2021 | Huffman ................. | H04L 63/02 |
| 2023/0196233 A1* | 6/2023 | Fisher .............. | G06Q 10/06313 726/4 |

FOREIGN PATENT DOCUMENTS

WO    2021062242 A1    4/2021

OTHER PUBLICATIONS

Extended European Search Report from EP Application No. 23161040.3, dated Dec. 17, 2023, 7 pages.

* cited by examiner

*Primary Examiner* — Michael W Choi
(74) *Attorney, Agent, or Firm* — Stinson LLP (57) ABSTRACT

Method and system for provisioning industrial assets. A provisioning server processes location data and an identifier associated with a selected industrial asset for verifying a presence of the asset within a predefined area and for determining a feature set for the asset. The location data is indicative of a location of the asset and the identifier identifies the asset and has the feature set associated therewith. The provisioning server then retrieves a license and/or configuration corresponding to the feature set for the asset from the repository in response to the asset being located within the predefined area. The provisioning server provisions the asset with the retrieved license and/or configuration.

15 Claims, 6 Drawing Sheets

LOCATION-BASED LICENSING AND CONFIGURATION

BACKGROUND

Industrial automation systems typically include many industrial assets executing many applications. The large number of assets and applications creates a complicated situation for managing licenses and configuring hardware. For instance, each specific device must be tracked for not only its purpose but also its location because both can impact licensing and configuration. As a result, users, original equipment manufacturers (OEMs), resellers, and the like must first have knowledge of and then manage a large number of device-specific codes. If a device is replaced or upgraded, for example, new codes specific to this particular device must be entered into it to confirm the licensing status and to enable the device for configuration. Tracking and entering device-specific codes is a time-consuming operation and a frequent source of complaint. Conventional licensing systems attempt to mitigate this problem through use of a web portal for transferring licenses between devices without involving the OEM but device-specific information and activities are still required.

SUMMARY

Aspects of the present disclosure employ location services to determine the location of a particular industrial asset. Once the location and a device identifier are reported, a central server-based system provisions the asset's feature license and/or configuration.

In an aspect, a method of provisioning one or more industrial assets includes processing location data and an identifier associated with a selected industrial asset to verify a presence of the selected industrial asset within a predefined area and to determine a feature set for the selected industrial asset. The location data is indicative of a location of the selected industrial asset and the identifier identifies the selected industrial asset and has the feature set associated therewith. The method further includes retrieving at least one of a license and a configuration corresponding to the feature set for the selected industrial asset in response to the selected industrial asset being located within the predefined area and provisioning the selected industrial asset with the retrieved at least one of the license and the configuration.

In another aspect, a system for provisioning one or more industrial assets includes a repository storing license and configuration information for a plurality of industrial assets, a selected industrial asset, a provisioning server coupled to the selected industrial asset and to the repository via a data communication network, and a memory storing computer-executable instructions. When executed, the instructions configure the provisioning server to process location data and an identifier associated with the selected industrial asset for verifying a presence of the selected industrial asset within a predefined area and for determining a feature set for the selected industrial asset. The location data is indicative of a location of the selected industrial asset and the identifier identifies the selected industrial asset and has the feature set associated therewith. The executed instructions further configure the provisioning server to retrieve, from the repository, at least one of a license and a configuration corresponding to the feature set for the selected industrial asset in response to the selected industrial asset being located within the predefined area and provision the selected industrial asset with the retrieved at least one of the license and the configuration.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
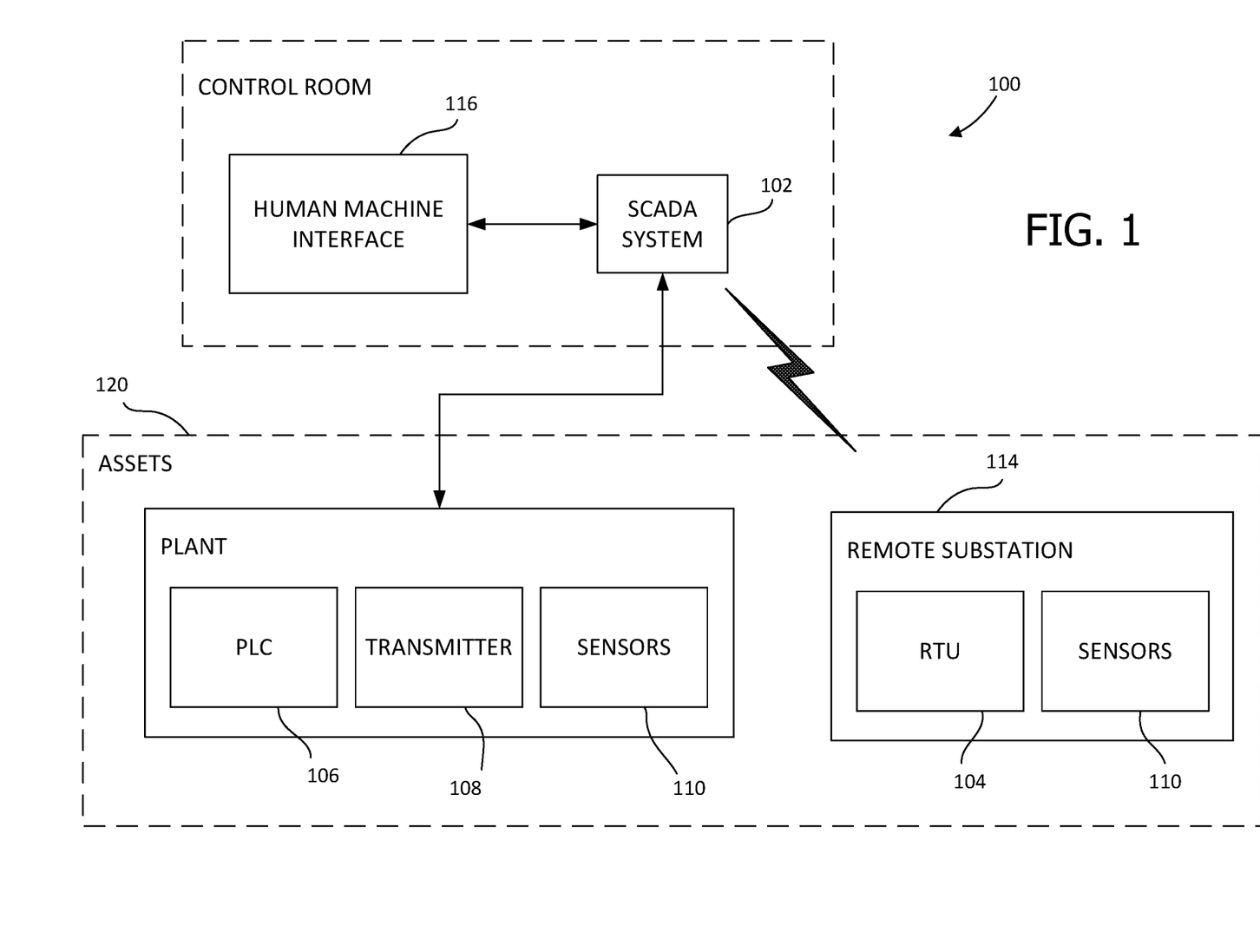
FIG. 1 illustrates an automation system according to an embodiment.

Referring to FIG. 1, a schematic overview of an automation system is generally indicated 100. The automation system 100 includes a Supervisory Control and Data Acquisition (SCADA) system 102 communicating with one or more industrial assets, generally indicated at 120. In the illustrated embodiment, the industrial assets 120 include industrial control and monitoring devices such as a remote terminal unit (RTU) 104, a programmable logic controller (PLC) 106, a multivariable transmitter (MVT) 108, and a peripheral 110 (e.g., sensor, actuator, variable frequency drive, motor controller, pressure transmitter, Coriolis meter, magnetic flow meter, etc.). In another embodiment, asset 120 comprises a computing device.

As described below, aspects of the present disclosure employ location services to determine the location of a particular industrial asset 120. Once the location and a device identifier are reported, a central server-based system provisions the asset's feature license and/or configuration.

Figure 2:
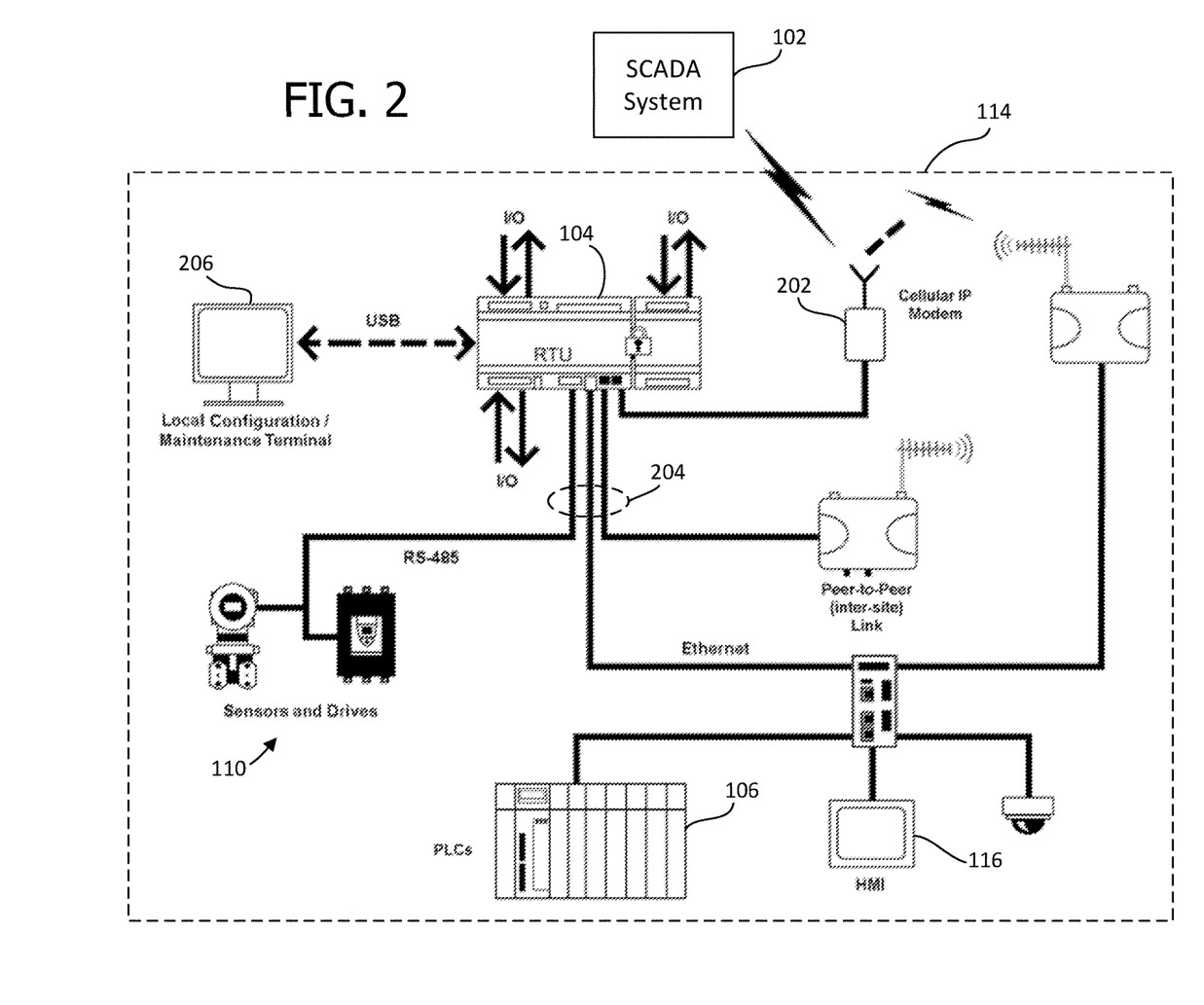
FIG. 2 is a block diagram of a remote substation including a remote terminal unit (RTU) of FIG. 1.

The SCADA system 102 of FIG. 1 is coupled to a remote substation 114 via a communications network 202, such as a private data radio network and/or a cellular telephone network. The substation 114 typically includes a number of peripherals 110 and at least one RTU 104 for data acquisition from substation 114 and/or from SCADA system 102. The RTU 104 transmits telemetry data to SCADA system 102 and receives messages back for controlling connected physical objects of remote substation 114.

As shown in FIG. 1, SCADA system 102 operates in conjunction with a human-machine interface (HMI) 116. The HMI 116 is an input-output device that presents process information to a human operator. The SCADA system 102 links to HMI 116 for providing maintenance procedures, detailed schematics, logistic information, trend data, diagnostic data, and the like for a specific sensor or machine. In an embodiment, HMI 116 comprises a personal computer, smartphone, tablet, touchscreen HMI device, or the like. Although illustrated in a control room remotely from the various industrial assets 120, it is to be understood that HMI 116 could be hosted on the device itself.

In addition to the RTU 104, peripherals 110, and other components of remote substation 114, SCADA system 102 communicates with at least one PLC 106. In a SCADA-based control system, PLC 106 is connected to, for example, a sensor (i.e., peripheral 110) for collecting the sensor output signals and converting the signals into digital data. The SCADA system 102 may also communicate with a transmitter, such as MVT 108, which is used to measure flow, differential pressure, temperature, pressure, and the like.

As described above, industrial automation systems, such as system 100, typically include many industrial assets 120 executing many applications. The large number of assets 120 and applications creates a complicated situation for managing licenses and configuring hardware. For instance, each specific device such as RTU 104, PLC 106, MVT 108, peripheral 110, etc. must be tracked for not only its purpose but also its location because both can impact licensing and configuration. As a result, users, original equipment manufacturers (OEMs), resellers, and the like must first have knowledge of and then manage a large number of device-specific codes. If a device is replaced or upgraded, for example, new codes specific to this particular device must be entered into it to confirm the licensing status and to enable the device for configuration.

Aspects of location-based licensing and configuration may be applied to various industrial assets 120 in various control systems, including one or more of RTU 104, PLC 106, MVT 108, and peripheral 110. For the sake of convenience, however, the description below refers to an example in which the industrial asset 120 is RTU 104 of SCADA system 102.

In an embodiment, the RTU 104 is used as a control device. A communication bus 204 provides communication for the complete substation 114 and all parts of the substation are accordingly connected thereto, whether directly or indirectly. The RTU 104 is configured to be connected to a computer 208 (e.g., a personal computer, desktop, laptop, workstation machine, etc.) to access and control settings and parameters as well as a real-time database.

The RTU 104 is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 104 in an oil and gas application include: tank monitoring and automation; well test automation; Emergency Shut-Down (ESD) at well heads; well production and optimization; and measurement.

In an oil and gas environment, for example, substation 114 is located at a well site to gather data about various aspects of the well site for monitoring and tracking purposes. The substation 114, which acts as a control unit, includes RTU 104 for collecting data on pump motor operation (e.g., motor speed and load). A variable speed drive motor controller, for example, generates this motor data. The RTU 104 also collects measurements from various wireless and wired field sensors around the well site. These field sensors include a proximity sensor mounted near the crank arm of a rod pump assembly and a load cell mounted between the bridle and polished rod of the rod pump assembly. From this data, RTU 104 can determine the tension or load (vertical axis) on the rod versus the displacement (horizontal axis) of the rod per stroke or pump cycle (i.e., upward and downward movement). Other data collected by RTU 104 from the field sensors may include fluid flow rate, temperature, pressure, and the like.

In an embodiment, RTU 104 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 104 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU 104 embodying aspects of the present disclosure involves electrical applications such as wind, solar, transformer stations, etc. Diversification of energy production resources require utility operators to manage a much wider portfolio of assets. Moreover, assets such as wind turbines and solar cells are often located in harsh, remote environments. In an embodiment, RTU 104 monitors active and reactive power, phase voltage, connection status of switches, and the like.

Yet another use case for the RTU 104 embodying aspects of the present disclosure involves autonomous, remotely located assets 120, including critical infrastructure assets, where high control system, monitoring, and reporting availability as well as data analytics associated with control systems, asset performance, and custom application features are requested.

Figure 3:
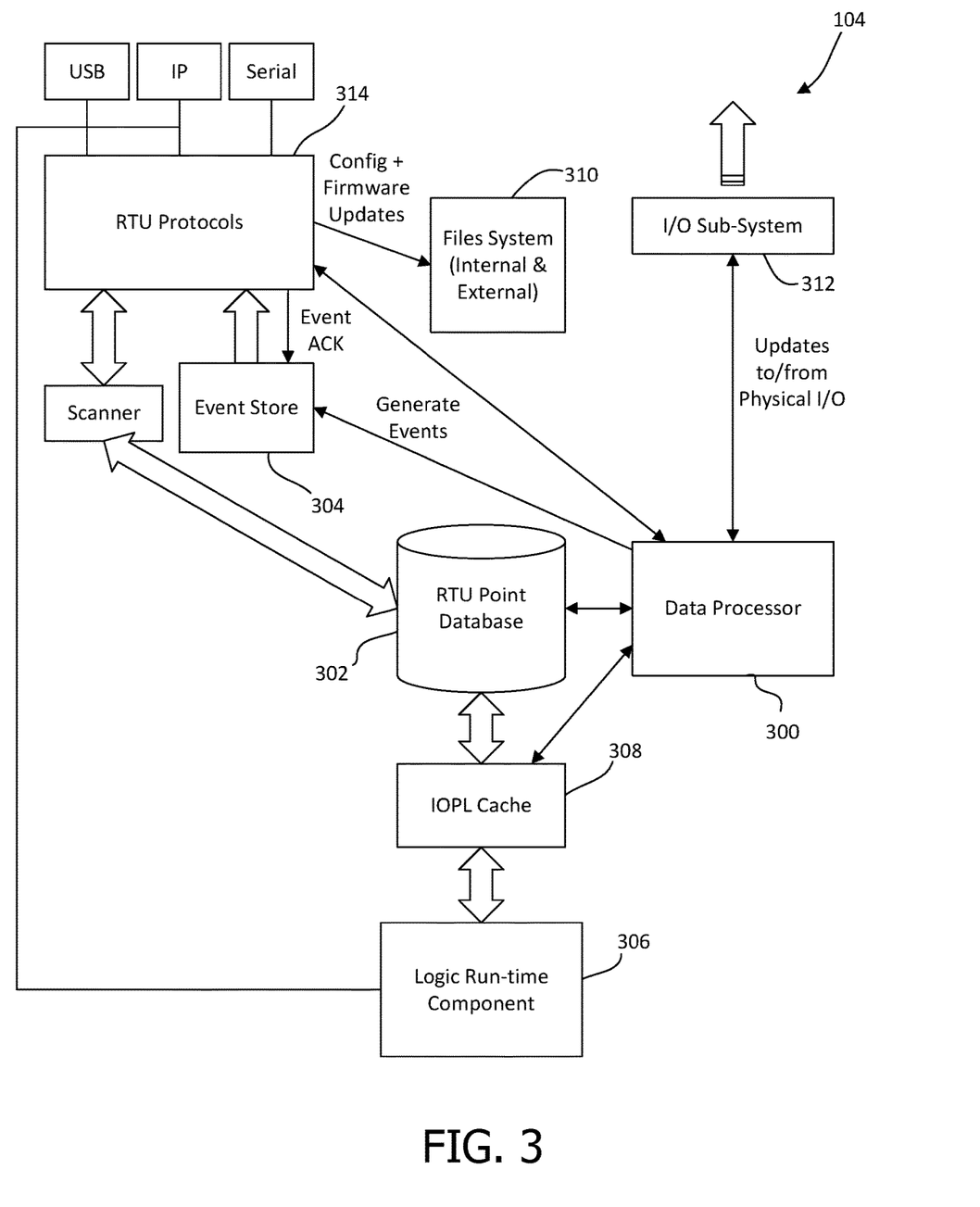
FIG. 3 is a block diagram illustrating an example internal architecture of the RTU of FIG. 2.

FIG. 3 illustrates aspects of an example internal architecture of RTU 104 according to an embodiment. A central processing unit (CPU) 300, indicated in FIG. 3 as a data processor, is the central component by which changes to the status of RTU 104 are managed. The RTU 104 includes a point database 302, an event store 304, a logic run-time component 306, and a cache 308 of the IOPL (i.e., I/O process list, which copies instructions for logic run-time state and end-of-scan data transfers). In the illustrated embodiment, RTU 104 further includes a filesystem 310, an I/O sub-system 312, and a store of RTU protocols 314.

The CPU 300 is responsible for updating the point database 302 based on information from other parts of substation 114, including physical I/O updates from upstream remote protocols via the I/O sub-system 312, local or downstream device data, local run-time logic execution, etc. In an embodiment, the internal systems of RTU 104 manage event storage, with time-stamped data. Events are captured in the event store 304 based on an RTU configuration associated with physical I/O, downstream data sources, and internal data items (including data items coming from logic run-time 306). Events are reported upstream to client stations through remote protocols 314. Confirmation messages from upstream client stations remove successfully delivered events from the RTU event store 304. The filesystem 310 of the RTU 104 provides storage for delivery of data items such as full or incremental configuration, firmware upgrades, logic applications, etc.

Figure 4:
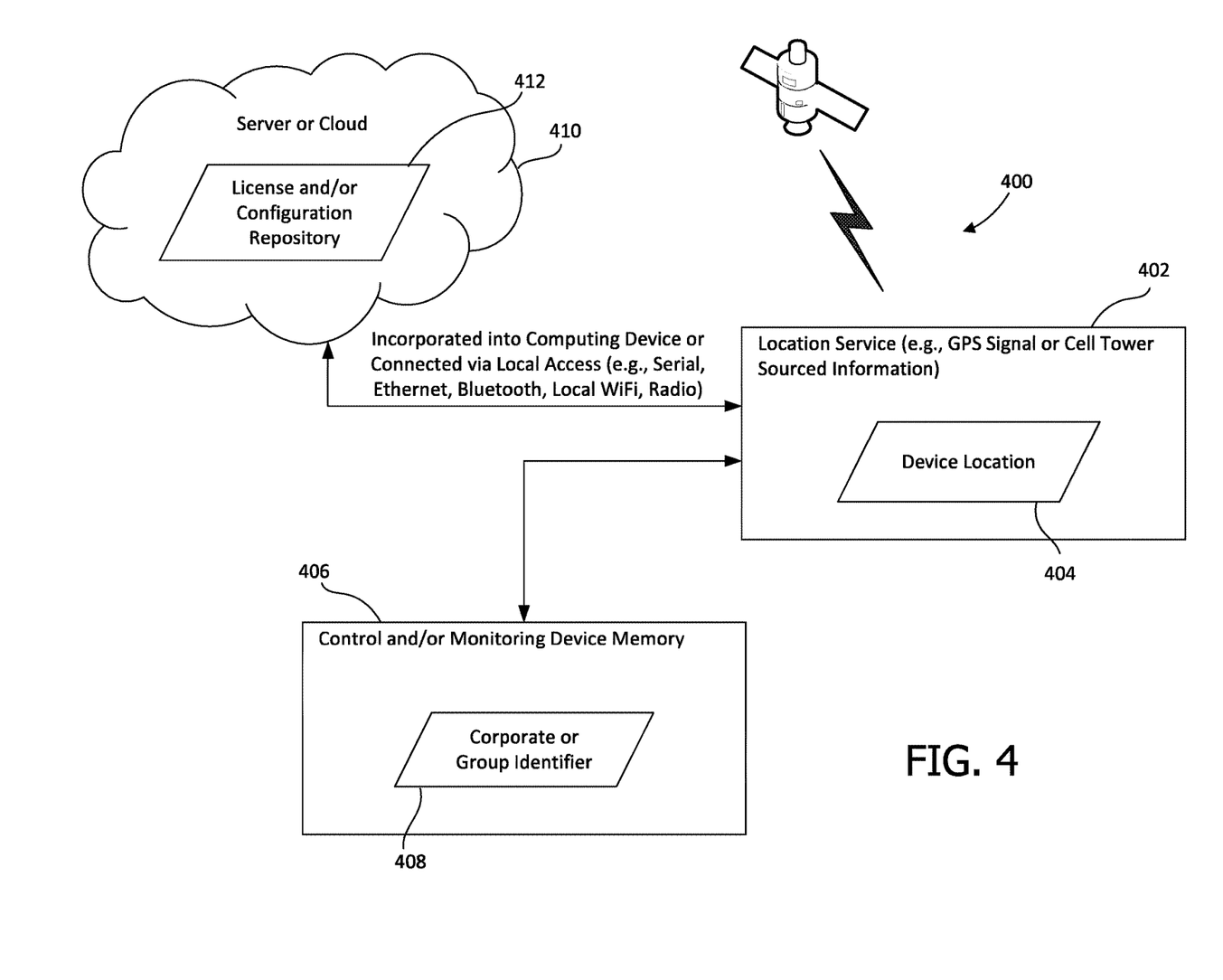
FIG. 4 is a block diagram of a system for locating and identifying industrial assets of the automation system of FIG. 1.

FIG. 4 illustrates a system 400 for locating and identifying industrial assets 120 to implement location-based licensing and configuration. As shown in FIG. 4, aspects of the present disclosure employ a location service 402 to determine a location 404 of a particular industrial asset 120, namely, a control and/or monitoring device (e.g., RTU 104, PLC 106, or sensor 110, or software residing on the device). The determined location 404 may be an actual location or a location relative to a known location. For example, location 404 represents where RTU 104 is located within an oil field, wastewater facility, etc. In an embodiment, a processor (e.g., CPU 300 of RTU 104) or a separate computing device associated with asset 120 executes computer-executable instructions for determining the location 404 using information provided by a satellite-based location technology such as Global Positioning System (GPS), Global Navigation Satellite System (GLONASS), Galileo, Navigation with Indian Constellation (NavIC), or Quasi-Zenith Satellite System (QZSS). In another embodiment, the location service 402 employs an alternate locating technology such as cell tower triangulation, television signal synchronization, WiFi positioning, Radio Frequency Identification (RFID), and the like to determine the location 404 of the industrial asset 120.

Referring further to FIG. 4, a memory 406 associated with asset 120 stores an identifier 408 specifying, for instance, an organizational identity of asset 120. In an embodiment, the identifier 408 comprises a group/corporate/individual identifier corresponding to the organization that has purchased the license to use the device (i.e., asset 120) and specific features authorized the license. For example, an energy customer with oil and gas wells and/or pipelines may use a flow computer to provide measurements and logs of fluid transfer normalized to environment conditions whereas a water customer does not require this feature. In this example, the flow computer specific to oil and gas use cases is a licensed set of features such that only energy customers will purchase it. The location service 402 reports the device location 404 and identifier 408 associated with asset 120 to a provisioning server 410 via a data communication network. In turn, the provisioning server 410 processes at least the information relating to the location 404 of asset 120 and the information relating to the organizational or corporate identifier 408 associated with asset 120 to determine appropriate licensing and/or configuration provisions for the asset. It is to be understood that provisioning server 410 may be a central server or a cloud-based system.

The provisioning server 410 retrieves a feature license and/or configuration from a repository 412 based on the reported location 404 and identifier 408. In this manner, the asset's feature license and/or configuration is provisioned. Similarly, the retrieved feature license and/or configuration may be used to provision an application residing in memory 406 of asset 120. As described herein, provisioning asset 120 includes activating a license to enable a hardware feature set of or a software feature set residing on asset 120 and/or configuring asset 120.

In an embodiment, location service 402 and provisioning server 410 communicate with each with local access (e.g., Serial, Ethernet, Bluetooth, Local WiFi, Radio). In an alternative embodiment, the processor of asset 120 executes computer-executable instructions for configuring the processor to communicate with provisioning server 410 remotely via the Internet.

In an embodiment, the license remains active so long as asset 120 remains within specified industrial area or predetermined geographical location (e.g., a geofence or deadband). In this embodiment, location service 402 remains active and connected to the satellite-based or other location technology and is deprovisioned device in response to the asset 120 leaving the area. In another embodiment, asset 120 is provisioned initially while in its deployment location and then retains its license and/or configuration thereafter.

It is to be understood that a central server or cloud-based system (e.g., provisioning server 410), or one or more systems or devices associated with it, is capable of learning the location of the industrial asset 120. In an embodiment, server 410 is configured to determine the location of asset 120 to be licensed by interrogating the device and its connected geolocating technology of location service 402 (e.g., GPS connection, SIM card, etc.). The server 410 then matches the location 404 to an identified license or configuration geographical zone. If the device type, zone, organization, etc. correspond to a license and/or configuration to be assigned to a device, then the server 410 provisions the device with the configuration and/or license assigned to a new device in that zone.

Figure 5:
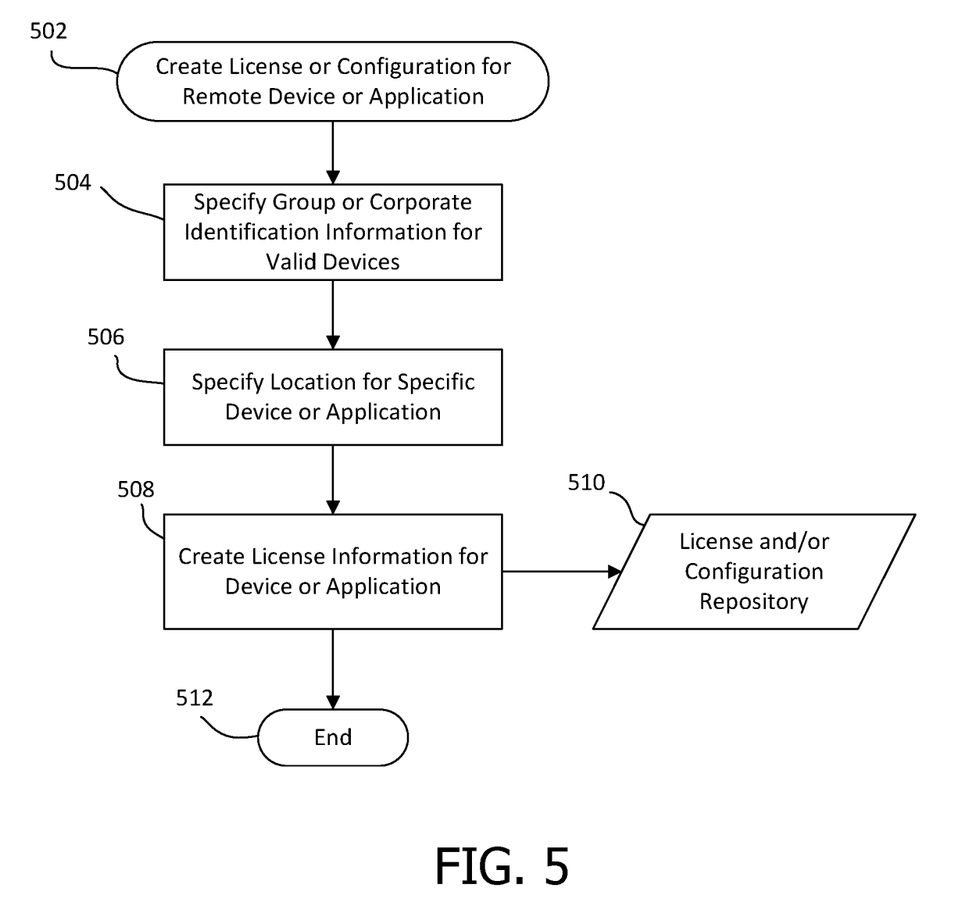
FIG. 5 is a flow diagram illustrating an example process for populating a license and/or configuration repository of FIG. 4.

FIG. 5 illustrates an example process for populating the license and/or configuration repository 412 of FIG. 4. The example process for creating a license and/or configuration for asset 120, which can be a remote device or an application executing on the remote device, begins at 502. At 504, the organizational identifiers 408 for assets 120 are specified. The identifiers 408 provide, for example, group or corporate identification information tied to specific valid assets 120. The permitted locations for the specific assets 120 are set at 506. Proceeding to 508, the license and/or configuration information corresponding to the specific assets 120 is created at 508 and stored in the repository 412 at 510. The process of FIG. 5 ends at 512.

Figure 6:
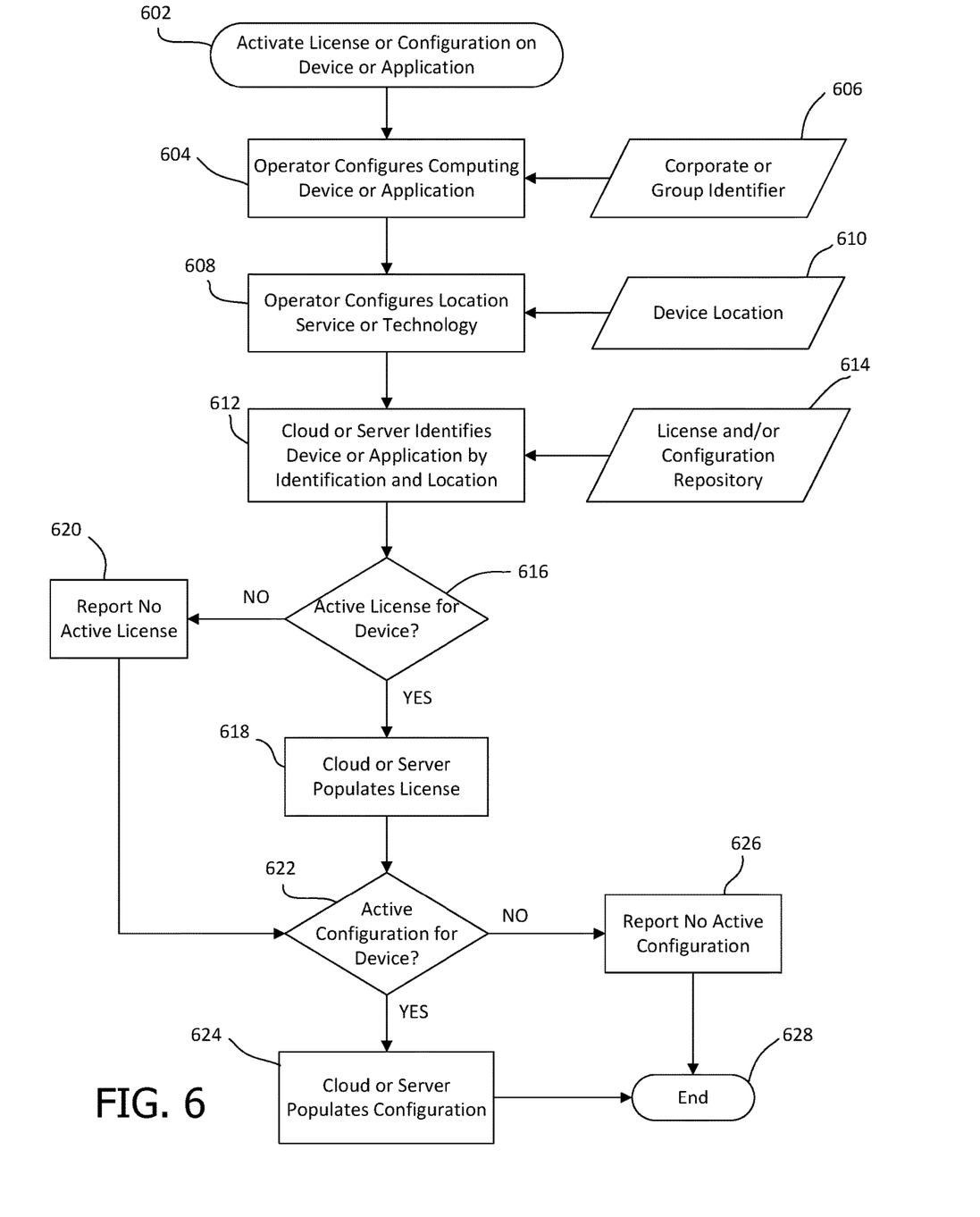
FIG. 6 is a flow diagram illustrating an example process for provisioning feature licenses and/or configurations of the assets of FIG. 4.

FIG. 6 illustrates an example process for provisioning feature licenses and/or configurations of the assets 120. The example process of FIG. 6, which begins at 902, activates a license and/or configuration on asset 120. During setup, for example, an operator configures asset 120 at 604, inputting the corporate or group identifier 408 at 606 for the particular remote device or application. The step may be performed by plugging in asset 120, connecting to a network via USB or telephone, logging into a client remote connections app, etc. Proceeding to 608, the operator configures location service 402 for retrieving the device location 404 at 610 to detect a presence of asset 120 in a specific industrial area (e.g., a predefined or user-configured area). At 612, provisioning server 410 identifies the particular asset 120 by identifier 408 and location 404 for retrieving, at 614, the associated license and/or configuration information from repository 412. In an embodiment, the information relating to the location 404 of asset 120 and the information relating to the organizational or corporate identifier 408 associated with asset 120 are determined or received subsequent to detecting the presence of asset 120 in the industrial area.

Referring further to FIG. 6, the license for asset 120 is determined at 616 to be active if the identifier 408 and location 404 match predetermined criteria stored in repository 412. If the license for asset 120 is active, provisioning server 410 populates the license at 618. If the license is not active, provisioning server 410 reports the license status at 620. Proceeding to 620, if the configuration of asset 120 is active, provisioning server 410 populates the configuration at 624. On the other hand, if the configuration of asset 120 is not active, provisioning server 410 report the configuration status at 626. In an embodiment, provisioning server 410 determines or receives information relating to capabilities of the industrial asset 120, wherein the appropriate licensing and/or configuration provisions for the asset are determined, at least in part, on the information relating to its capabilities. The process of FIG. 6 ends at 628.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method of provisioning one or more industrial assets, comprising:
   processing, by a provisioning server, location data and an identifier associated with a selected industrial asset to verify a presence of the selected industrial asset within a predefined area and to determine a feature set for the selected industrial asset, the location data indicative of a location of the selected industrial asset, the identifier identifying the selected industrial asset based on the location data and the identifier, and the identifier representing an organizational status associated with the selected industrial asset, the organizational status defining the feature set for the selected industrial asset identified by the identifier;

retrieving, by the provisioning server, a license and a configuration corresponding to the feature set for the selected industrial asset, wherein the provisioning server retrieves the license and the configuration from a repository coupled therewith in response to the selected industrial asset based on the location data and the identifier indicating the selected industrial asset being located within the predefined area, and wherein the repository stores license and configuration information for a plurality of industrial assets;

provisioning, by the provisioning server, the selected industrial asset with the retrieved license and configuration to enable configuration of the selected asset per the license with the associated feature set;

updating the location data in response to the selected industrial asset leaving the predefined area; and deprovisioning the selected industrial asset in response to the selected industrial asset leaving the predefined area as indicated by the updated location data.

2. The method of claim 1, wherein the selected industrial asset is coupled to the provisioning server via a data communication network, and further comprising receiving, by the provisioning server, the location data from the selected industrial asset via the data communication network.

3. The method of claim 1, wherein a location service generates the location data associated with the selected industrial asset, the location services comprising at least one of the following: a satellite-based location service, a cell tower triangulation location service, a television signal synchronization location service, a WiFi positioning location service, and a Radio Frequency Identification (RFID) location service.

4. The method of claim 1, further comprising detecting the presence of the industrial asset within the predefined area, wherein the location data indicative of the location of the selected industrial asset is generated in response to the presence of the selected industrial asset being detected within the predefined area.

5. The method of claim 1, wherein the feature set for the selected industrial asset represents capabilities thereof, and further comprising determining the license and the configuration for the selected industrial asset as a function of the capabilities of the selected industrial asset.

6. The method of claim 1, further comprising learning, by the provisioning server, the location of the selected industrial asset.

7. The method of claim 1, wherein the selected industrial asset includes at least one of: a remote terminal unit (RTU), a programmable logic controller (PLC), a multivariable transmitter (MVT), or a sensor.

8. A system for provisioning one or more industrial assets, comprising:
a repository storing license and configuration information for a plurality of industrial assets;
a selected industrial asset;
a provisioning server coupled to the selected industrial asset and to the repository via a data communication network; and
a memory storing computer-executable instructions that, when executed by the provisioning server, configure the provisioning server to:
process location data and an identifier associated with the selected industrial asset for verifying a presence of the selected industrial asset within a predefined area and for determining a feature set for the selected industrial asset based on the location data and the identifier, the location data indicative of a location of the selected industrial asset, the identifier identifying the selected industrial asset and representing an organizational status associated therewith, the organizational status defining the feature set for the selected industrial asset identified by the identifier;
retrieve, from the repository, a license and a configuration corresponding to the feature set for the selected industrial asset based on the location data and the identifier indicating the selected industrial asset being located within the predefined area;
provision the selected industrial asset with the retrieved license and configuration to enable configuration of the selected asset per the license with the associated feature set;
update the location data in response to the selected industrial asset leaving the predefined area; and
deprovision the selected industrial asset in response to the selected industrial asset leaving the predefined area as indicated by the updated location data.

9. The system of claim 8, wherein the provisioning server receives the location data from the selected industrial asset via the data communication network.

10. The system of claim 8, further comprising a location service for generating the location data associated with the selected industrial asset, the location services comprising at least one of the following: a satellite-based location service, a cell tower triangulation location service, a television signal synchronization location service, a WiFi positioning location service, and a Radio Frequency Identification (RFID) location service.

11. The system of claim 8, wherein the location data indicative of the location of the selected industrial asset is generated in response to the presence of the selected industrial asset being detected within the predefined area.

12. The system of claim 8, wherein the feature set for the selected industrial asset represents capabilities thereof, and wherein the license and the configuration for the selected industrial asset is determined as a function of the capabilities of the selected industrial asset.

13. The system of claim 8, wherein the provisioning server learns the location of the selected industrial asset.

14. The system of claim 8, wherein the selected industrial asset includes at least one of: a remote terminal unit (RTU), a programmable logic controller (PLC), a multivariable transmitter (MVT), or a sensor.

15. The system of claim 8, wherein the provisioning server comprises one or more networked servers in a cloud computing environment.

* * * * *